United States Patent [19]
Jeffers

[11] Patent Number: 5,413,903
[45] Date of Patent: May 9, 1995

[54] ELEMENT HAVING A TRANSPARENT MAGNETIC RECORDING LAYER CONTAINING BARIUM FERRITE PARTICLES

[75] Inventor: Frederick J. Jeffers, Escondido, Calif.

[73] Assignee: Eastman Kodak Company, Rochester, N.Y.

[21] Appl. No.: 135,227

[22] Filed: Oct. 12, 1993

[51] Int. Cl.6 .................. G03C 1/76; G03C 3/00; B05D 3/14
[52] U.S. Cl. .................. 430/523; 430/495; 430/601; 430/140; 427/130; 428/694 BA; 428/694 BH
[58] Field of Search .............. 430/496, 501, 140, 523; 427/130; 428/694 BA, 694 BH

[56] References Cited

U.S. PATENT DOCUMENTS

| | | |
|---|---|---|
| 3,782,947 | 1/1974 | Krall . |
| 4,279,945 | 7/1981 | Audran et al. ............ 430/140 |
| 4,302,523 | 11/1981 | Audran et al. ............ 430/140 |
| 4,859,495 | 8/1989 | Peng ........................ 427/48 |
| 5,227,283 | 7/1993 | Mori ........................ 430/523 |

FOREIGN PATENT DOCUMENTS

| | | |
|---|---|---|
| 0476535 | 3/1992 | European Pat. Off. . |
| 0407738A | 3/1992 | Japan . |
| 04096052A | 3/1992 | Japan . |
| 0412631A | 4/1992 | Japan . |
| 04124640A | 4/1992 | Japan . |

*Primary Examiner*—Charles L. Bowers, Jr.
*Assistant Examiner*—Mark F. Huff
*Attorney, Agent, or Firm*—Robert A. Gerlach

[57] ABSTRACT

A silver halide photographic element comprising a support having thereon at least one light-sensitive silver halide emulsion layer and a transparent magnetic recording layer on the substrate, the transparent magnetic recording layer having barium ferrite platelet particles in a transparent binder, the barium ferrite platelet particles being aligned such that the easy axis of the particles is parallel to the substrate.

10 Claims, 2 Drawing Sheets

1

ELEMENT HAVING A TRANSPARENT MAGNETIC RECORDING LAYER CONTAINING BARIUM FERRITE PARTICLES

BACKGROUND OF THE INVENTION

1. Field of the Invention

This invention relates to transparent magnetic recording elements and more particularly to photographic elements having a transparent magnetic layer containing barium ferrite platelet-shaped particles.

2. Description of Related Art

It has been heretofore known in U.S. Pat. No. 3,782,947 to prepare photographic products with a photographically transparent magnetic recording media on the photographic product in order that the photographic image may be viewed via the magnetic distribution and the magnetic distribution may be employed for recording and playback of information. U.S. Pat. Nos. 4,279,945 and 4,302,523 also relate to such photographic products and to a process of preparing the same wherein the magnetic recording layers have a total transmission of at least 20% for visible light having a wavelength of 632.8 nm and a ratio of direct transmission to total transmission at this wavelength of at least 50%.

U.S. Pat. No. 5,227,283 relates to a photographic material with a transparent magnetic recording layer containing hexagonal platy barium ferrite particles.

SUMMARY OF THE INVENTION

In the preparation of elements containing a transparent magnetic layer, any improvement with regard to the transparency of the magnetic layer over the complete range of the visible spectrum is desired. Further, because of the very low concentration of magnetic particles in the magnetic layer, in order to ensure the transparency required for the photographic portion of the element to satisfy all of the requirements thereof for such elements, the signal generated in the magnetic layer must be sufficient in order that it can be read out without difficulty. Thus, since magnetic particles are optically opaque generally, the pigment concentration must be very small so that light absorption is as low as possible in the magnetic layer. The very low particle concentration results in very low magnetic signals and, hence, a low signal-to-noise ratio.

This invention provides a magnetic recording element having a transparent magnetic recording layer on a substrate wherein the transparent magnetic recording layer comprises longitudinally oriented barium ferrite platelet-shaped particles, thus producing a more transparent panchromatic magnetic layer. By longitudinally oriented is meant that the magnetic easy axis of the platelets is parallel to the major plane of the coating.

The platelet-shaped barium ferrite particles have an aspect ratio of at least 5:1 and a volumetric concentration of less than 10 percent which is magnetically oriented in the plane of the magnetic coating. Preferably, the aspect ratio (width-to-thickness ratio) can be as high as 15:1 with a preferred range of from about 8:1 to about 12:1.

It is an advantage of the invention that higher loadings of magnetic particles in the magnetic layer can be produced giving a higher signal readout while at the same time maintaining its transparent nature because of the alignment of the barium ferrite platelet particles perpendicular to the media travel direction, i.e., the easy axis of the particles is parallel to the media travel direction.

It is another advantage that nearly all of the relatively small amount of light that does strike the edges of the platelet shaped particles is absorbed, rather than partially transmitted. This results in a more panchromatic or color free coating.

DESCRIPTION OF THE PREFERRED EMBODIMENTS

Figure 1:
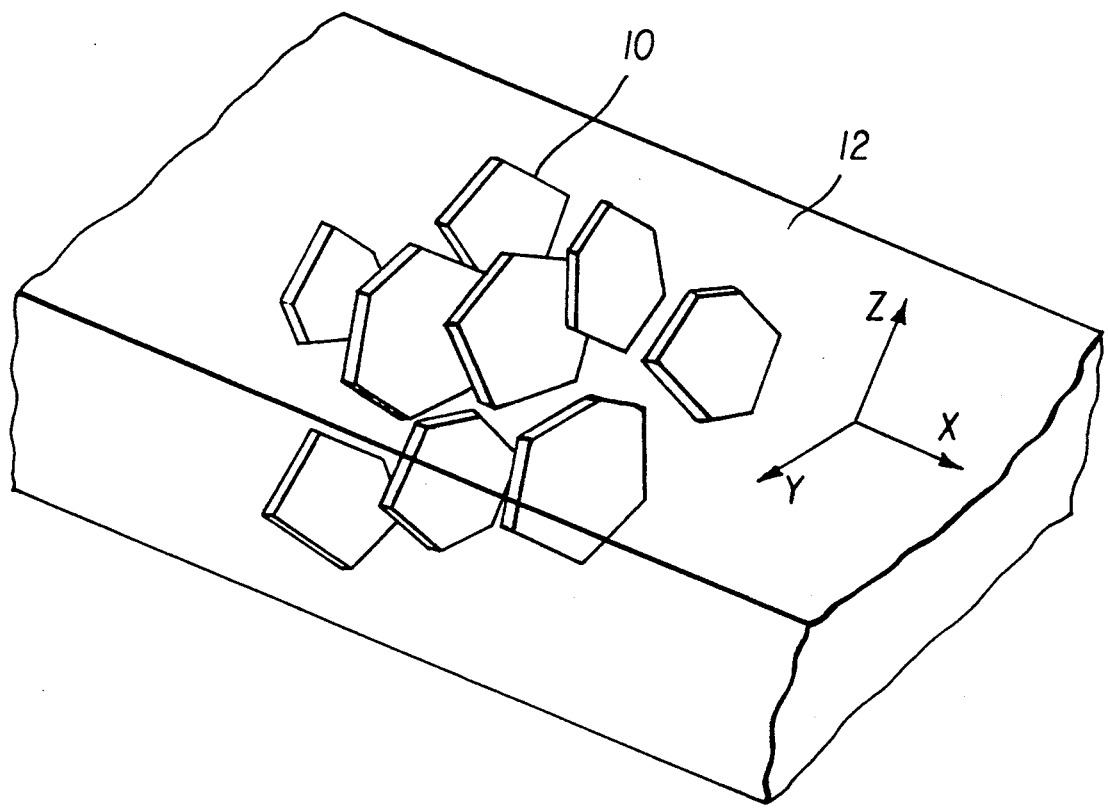
FIG. 1 is a diagrammatic representation of a transparent magnetic layer in accordance with this invention.

FIG. 1 is a representation of a transparent magnetic layer in accordance with this invention wherein barium ferrite platelet particles 10 are disposed in a layer 12 of a transparent binder medium wherein Z is the direction through the thickness of the layer, Y is the direction through the width of the layer and X is the direction of travel of the media during preparation. The direction X also is the easy axis of the barium ferrite platelets, thus, the easy axis of the barium ferrite platelets is parallel to the direction of travel and normal to the plane of the platelets. This configuration provides maximum remanent magnetic moment and minimum optical density when the platelets have a large width-to-thickness ratio as described above. The concentration of the barium ferrite platelets in the binders can range from 0.2 percent to about 2 percent while still maintaining an acceptable optical density for the photographic application. The barium ferrite platelet containing magnetic layer is applied to a support such as, for example, any of the suitable photographic film supports known in the art such as, for example, cellulose nitrate, cellulose esters including cellulose triacetate and diacetate, polystyrene, polyamides, homo and copolymers of vinyl chloride, polyvinylacetal, polycarbonate, homo and copolymers of olefins such as polyethylene and polypropylene, polyesters including polyethylene terephthalate and polyethylene naphthalate, paper supports including photographic paper coated with resin layers including polyolefins such as polyethylene, polypropylene and copolymers thereof, and the like. In FIG. 1 the support is not shown.

The magnetic recording layers in accordance with this invention are applied to the photographic film base either directly or on a previously applied tie layer present for the promotion of adhesion by any of the techniques known in the art including cocasting, laminating and coating. The coating composition generally includes the magnetic particles, a polymeric binder material that produces a transparent layer and a solvent for the binder material. Other addenda may also be employed in the preparation of the coating compositions in order to satisfy certain requirements including dispersing aids, and the like. Suitable binder materials include cellulose esters, vinyl polymers and copolymers such as vinyl chloride, vinyl acetate, vinyl alcohol and the copolymers thereof, acrylic resins, polyvinyl acetal resins, polyvinyl buteryl resins, polyester urethane resins, polyether urethanes, polycarbonates, polyaddition polymers of ethylenically unsaturated monomers such as polystyrene, polyacrylonitrile, polyacrylic acid, polyesters of acrylic, methacrylic acids, gelatin and the like.

In a typical method of preparing the photographic film base having a magnetic layer in accordance with this invention, the coating composition containing the barium ferrite platelets is prepared and delivered to an extrusion hopper and coated onto a film support such as a polyethylene terephalate or a polyethylene naphthalate film support which passes beneath the extrusion die and upon which the coating composition is deposited. As the film support moves away from the hopper and the magnetic composition is still in a fluid state, it is passed through a magnetic field which is applied in the X direction and during this time sufficient gelation of the binder occurs to maintain the platelet particles aligned in accordance with that shown in FIG. 1. A general procedure for orienting magnetic particles is described in "*The Physics of Magnetic Recording*" by C. D. Mee, 1964, published by North-Holland Publishing Company Amsterdam and John Wiley & Sons, Inc.—New York, page 218. Transparent magnetic recording layers having oriented barium ferrite platelet particles in accordance with this invention demonstrate a higher squareness ratio (SR) and coercivity (Hc) than an unoriented layer. For example, an unoriented layer has an SR of 0.54 and an Hc of 731 Oe while one in accordance with the invention has an SR of 0.80 and an Hc of 813 Oe. This results in a higher magnetic signal and lower optical absorption.

The photographic elements in accordance with this invention comprise at least one silver halide containing photosensitive layer. Any of the known silver halide emulsion layers such as those described in *Research Disclosure* 308119, Issue No. 308, December 1989, are useful in preparing photographic elements in accordance with this invention. The photographic element is generally prepared by coating the support film with the photosensitive emulsion on the side opposite of the magnetic recording layer with one or more layers comprising a dispersion of silver halide crystals in an aqueous solution of gelatin and optionally one or more subbing layers. The preparation of photographic elements is generally widely known in the art and is done by continuously operating machinery wherein a single layer or a plurality of layers are simultaneously applied to the substrate.

The photographic elements may also include layers generally employed in photographic elements including conducting layers to prevent static charge on the photographic element, antihalation layers, protective overcoat layers, tie layers to promote adhesion between the various layers and the like.

Figure 2:
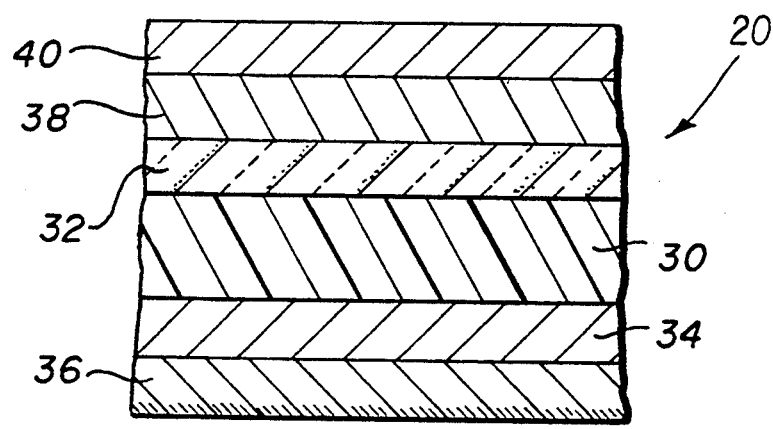
FIG. 2 is a cross-sectional view showing a photographic element in accordance with this invention.

FIG. 2 illustrates the general configuration of a photographic element in accordance with this invention. Photographic element 20 includes a flexible film support 30 having disposed on one side thereof, antistatic layer 32, barium ferrite containing magnetic layer in accordance with this invention 38 and an overcoat layer such as a lubricating layer of wax 40. On the opposite side of the film support 30 is disposed a subbing layer 34, to provide the necessary adhesion between the emulsion layers 36 and the substrate 30 for satisfactory performance. Such layers are widely known and used in the art and require no further elaboration here.

The invention will be further illustrated by the following examples:

EXAMPLE 1

Grind Phase

The ingredients of Table 1 are milled in an Eiger Mill at 43.6 percent solids until the dispersion appears free of aggregates.

TABLE 1

| Component | Amount of Solids (g) | Amount of Solvent (g) | Total (g) |
|---|---|---|---|
| Cyclohexanone | — | 481.1 | 481.1 |
| Dispersant (Emcal CC59) | 13.5 | — | 13.5 |
| Binder Stock Solutions | | | |
| UCARMAG 528 20% in cyclohexanone | 5.0 | 20.0 | 25.0 |
| Morthane* CA139 @ 15% | 5.0 | 28.3 | 33.3 |
| Lube @ 50% THF | 7.7 | 7.7 | 15.4 |
| Barium Ferrite** | 385.0 | — | 385.0 |
| TOTAL | 416.2 | 537.1 | 953.3 |

*A polyurethane available from Morton Thiokol Inc., Chicago, Ill.
**Specific surface area 31 m²/g - coercivity 603 Oe - saturated magnetization of powder 61 emu/gm.

Let Down Phase

The grind phase is let down with additional polymeric resin solution while still in the Eiger mill in accordance with Table 2.

TABLE 2

| Component | Amount of Solids (g) | Amount of Solvent (g) | Total (g) |
|---|---|---|---|
| Grind Phase | 416.2 | 537.1 | 953.3 |
| Morthane CA139 as 15% solution in cyclohexanone | 16.8 | 95.2 | 112.0 |
| Morthane CA139 as 15% solution in tetrahydrofuran (THF) | 60.4 | 341.9 | 402.3 |
| TOTAL at 28.36% solids | 493.4 | 974.2 | 1467.6 |

Second Let Down to Coating Composition

The first let down is once again let down in accordance with Table 3.

TABLE 3

| Component | Amount of Solids (g) | Amount of Solvent (g) | Total (g) |
|---|---|---|---|
| First Let Down | 2.69 | 5.31 | 8.0 |
| Morthane CA139 as 15% solution in cyclohexanone | 58.99 | 334.31 | 393.3 |
| Morthane CA139 as 15% solution in tetrahydrofuran (THF) | 59.31 | 336.09 | 395.4 |
| cyclohexanone | — | 402.0 | 402.0 |
| TOTAL | 120.99 | 1077.71 | 1198.7 |

A final composition of 10.1% solids, 0.175% barium ferrite pigment and 9.92% resin plus addenda results.

The concentration of magnetic pigment is further adjusted by addition of the first let down to this second let down in accordance with Table 4.

TABLE 4

| Component | Amount of Solids (g) | Amount of Solvent (g) | Total (g) |
|---|---|---|---|
| Second Let Down | 51.17 | 455.83 | 507 |

TABLE 4-continued

| Component | Amount of Solids (g) | Amount of Solvent (g) | Total (g) |
|---|---|---|---|
| First Let Down | 0.50 | 1.25 | 1.75 |

This mixture is mixed with a high speed Cowles type blade to yield a coating composition containing 0.266% by weight ferrite pigment.

The magnetic dispersion of Table 4 is cast onto a polyethylene naphthalate film base to give a dry down thickness of 1 to 3 $\mu$m and a barium ferrite lay down of 6 to 8 mgBaFe/ft$^2$. Immediately after the casting step, while the magnetic dispersion is still wet, the coated film is subjected to a magnetic field substantially parallel to the plane of the film base, the magnetic field being impressed by an array of permanent magnets or an electromagnet, the aligning field being greater than about 500 Oe.

The coated film is maintained in the magnetic field until the binder has sufficient consistency to hold the magnetic particles in the oriented position.

What is claimed is:

1. An optically transparent magnetic recording element comprising a substrate, and a transparent magnetic recording layer on the substrate, the transparent magnetic recording layer having barium ferrite platelet particles in a transparent binder, the barium ferrite platelet particles being aligned such that the easy axis of the particles is parallel to the substrate.

2. The element of claim 1 wherein the barium ferrite platelet particles have an aspect ratio of at least 5:1.

3. The element of claim 2 wherein the aspect ratio is within the range of 5:1 to 15:1.

4. The element of claim 2 wherein the aspect ratio is within the range of 8:1 to 12:1.

5. The element of claim 1 wherein the barium ferrite platelet particles are present in the transparent binder in a volumetric concentration of less than 10 percent.

6. A silver halide photographic element comprising a substrate having thereon at least one light-sensitive silver halide emulsion layer and a transparent magnetic recording layer on the substrate, the transparent magnetic recording layer having barium ferrite platelet particles in a transparent binder, the barium ferrite platelet particles being aligned such that the easy axis of the particles is parallel to the substrate.

7. The photographic element of claim 6 wherein the barium ferrite platelet particles have an aspect ratio of at least 5:1.

8. The photographic element of claim 7 wherein the aspect ratio is within the range of 5:1 to 15:1.

9. The photographic element of claim 7 wherein the aspect ratio is within the range of 8:1 to 12:1.

10. The photographic element of claim 6 wherein the barium ferrite platelet particles are present in the transparent binder in a volumetric concentration of less than 10 percent.

* * * * *